United States Patent [19]

Gleim

[11] Patent Number: 4,888,754

[45] Date of Patent: Dec. 19, 1989

[54] ARRANGEMENT FOR REPRODUCING DATA READABLE BY AN OPTICAL SCANNER FROM TRACKS OF A RECORDED MEDIUM

[75] Inventor: Günter Gleim, Villingen-Schwenningen, Fed. Rep. of Germany

[73] Assignee: Deutsche Thomson-Brandt GmbH, Villingen, Fed. Rep. of Germany

[21] Appl. No.: 188,459

[22] Filed: Apr. 29, 1988

[30] Foreign Application Priority Data

May 9, 1987 [DE] Fed. Rep. of Germany ....... 3715491

[51] Int. Cl.[4] ................................................ G11B 7/00
[52] U.S. Cl. ........................................ 369/44; 369/45
[58] Field of Search .............................. 369/32, 43–47; 358/342; 250/201 DF; 318/640

[56] References Cited

U.S. PATENT DOCUMENTS

| 4,707,817 | 11/1987 | Yoshio | 369/46 |
| 4,769,801 | 9/1988 | Funada | 369/46 X |
| 4,812,726 | 3/1989 | Benii | 318/640 |

Primary Examiner—Robert L. Richardson
Attorney, Agent, or Firm—Max Fogiel

[57] ABSTRACT

An arrangement for reproducing data readable by an optical scanner from tracks on a recorded medium. At least one beam of light is focused onto the medium, and the beam is positioned along the tracks by a tracking control. The recorded medium reflects the beam onto a photodetector which generates an electrical data signal having a phase relation, a focusing error signal also having a phase relation for indicating the current state of the focus control. A tracking error signal also supplied by the photodetector indicates the current state of the tracking control. A control amplifier is connected in the focus control and has an offset voltage. An offset compensation voltage is supplied to the input of the control amplifier for compensating the offset voltage of that amplifier. The offset compensation voltage is varied at the input of the control amplifier until the phase relation of the focusing error signal coincides with the phase relation of the data signal for obtaining the correct value for the offset compensation voltage.

3 Claims, 2 Drawing Sheets $HF = AS + BS + CS + DS$ $FE = (AS + CS) - (BS + DS) = 0$ $TE = ES - FS = 0$ $FE = (AS + CS) - (BS + DS) < 0$ $TE = ES - FS = 0$ $FE = (AS + CS) - (BS + DS) > 0$ $TE = ES - FS = 0$ $FE = (AS + CS) - (BS + DS) = 0$ $TE = ES - FS < 0$ $FE = (AS + CS) - (BS + DS) = 0$ $TE = ES - FS > 0$

ARRANGEMENT FOR REPRODUCING DATA READABLE BY AN OPTICAL SCANNER FROM TRACKS OF A RECORDED MEDIUM

BACKGROUND OF THE INVENTION

The invention re for reproducing data that can be read by an optical pick-up from the tracks on a recorded base in that at least one beam of light can be focused on the base by a control loop and positioned along the tracks by a tracking loop and in that the base reflects the beam onto a photodetector, which generates an electric data signal, a focusing-error signal that indicates the actual state of the focusing loop, and a tracking-error signal that indicates the actual state of the tracking loop.

Devices of this type, which are employed in compact-disk players, optico-magnetic equipment for recording and playback, equipment for recording and playing back draw disks, and videodisk players for example, are provided with an optical pick-up consisting of a laser diode, several lenses, a prism-based beam splitter, and a photodetector. The design and function of such an optical pick-up are described on pages 209–15 of Electronic Components and Applications, Vol. 6, No. 4 (1984).

The beam of light emitted by the laser diode is focused on the compact disk by lenses and reflected onto the photodetector from the disk. The data recorded on the disk is obtained along with the focusing-loop state and the tracking-loop state from the photodetector output signal. The aforesaid literature calls the focusing-loop state signal the "focusing error" and the tracking-loop state signal the "radial tracking error."

The component that controls the focusing loop is a coil with an objective lens that travels along its optical axis over the magnetic field. The focusing loop maintains the beam of light emitted by the laser diode constantly focused on the compact disk by linearly displacing the lens. The tracking loop, which is also often called a "radial drive mechanism," linearly displaces the optical pick-up along the radius of the compact disk, positioning the beam of light along the spiraling tracks on the disk.

The radial drive mechanism in some equipment comprises what are called a coarse-adjustment mechanism and a fine-adjustment mechanism. The coarse adjustment mechanism can for example be a spindle that radially displaces the whole optical pick-up, consisting of the laser diode, the lenses, the beam splitter, and the photodetector. The fine-adjustment mechanism can tilt the beam of light radially, at a prescribed angle for example, in order to advance just the beam by itself slightly along one radius of the compact disk.

Unobjectionable reproduction of the data, whether video and audio in the case of a videodisk player or audio alone in the case of a compact-disk player, demands, in addition to precisely focusing the beam of light on the videodisk or compact disk, precise positioning along the tracks on the disk.

The variable-gain amplifier in the focusing loop, however, is, like any variable-gain amplifier, subject to offset voltage to an extent that depends not only on temperature but also on chronic drift. The offset-voltage drift derives, along with the drift associated with other amplifier parameters, from the aging of the component.

To prevent data reproduction from being detrimentally affected by the offset voltage associated with the variable-gain amplifier, the voltage must be compensated. Manual adjustment of an equilibrating potentiometer in the control loop, however, can only be employed for approximate compensation because changes in the offset voltage due to temperature fluctuations and aging on the part of the amplifier are not allowed for.

SUMMARY OF THE INVENTION

The object of the invention is accordingly to improve a reproduction device as recited in the preamble to Claim 1 to the extent that the offset voltage associated with the variable-gain amplifier in the focusing loop can be compensated while the equipment is operating.

This object is attained in accordance with the invention in that, in order to compensate the offset voltage associated with the variable-gain amplifier in the focusing loop, an offset-compensation voltage at the input terminal of the variable-gain amplifier is varied until the phase relation of the focusing-error signal coincides with that of the data signal.

DESCRIPTION OF THE PREFERRED EMBODIMENT

The invention will now be described and specified with reference to FIGS. 1 and 2.

Figure 1:
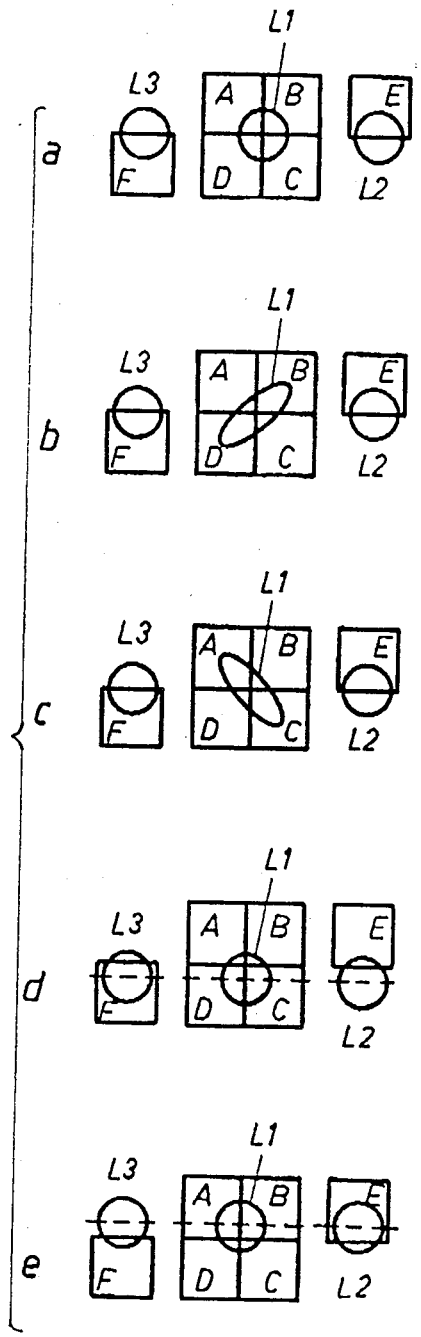
FIG. 1a–e illustrate the photodetector in a compact-disk player.

FIG. 1 illustrates a photodetector PD from the optical pick-up of a compact-disk player wherein three laser beams L1, L2, and L3 are focused on a compact disk. A pick-up of this type is called a "three-beam pick-up" in the reference previously cited herein.

Photodetector PD consists of four square photodiodes A, B. C, and D, themselves arrayed in the form of a square. Positioned outside and along the diagonal of the square consisting of diodes A, B, C and D are two other square photodiodes E and F.

The middle laser beam L1, which is focused on the four diodes A, B, C, and D, generates a data signal $HF=AS+BS+CS+DS$ and a focusing-error signal $FE=(AS+CS)-(BS+DS)$. The two outer laser beams L2 and L3, of which the one in front, L2, falls on a photodiode E and the one in the rear, L3, falls on a photodiode F, generate a tracking-error signal $TE=ES-FS$. AS, BS, CS, DS, ES, and FS are the photoelectric voltages of the diodes A, B, C, D, E, and F. An astigmatic collimator lens is positioned in the path of middle laser beam L1 in the optical pick-up, and the beam will accordingly be circular when precisely focused on the large square comprised of diodes A, B, C, and D and elliptical when out of focus.

FIG. 1a represents the situation in which the beam is focused and tracking is precise, which will be discussed later herein. Since the spot of light produced on the large square by laser beam L1 is circular, the focusing-error signal will be $FE=(AS+CS)-(BS+DS)=0$. The zero indicates to the focusing loop that the focus is precise.

FIG. 1b illustrates the situation in which the beam is out of focus because the objective lens is too far from the compact disk. The focusing-error signal is negative—$FE=(AS+CS)-(BS+DS)<0$. A negative value indicates to the focusing loop that the lens is too far from the disk. The controls in the loop accordingly move the lens toward the disk until the focusing-error signal becomes zero.

FIG. 1c illustrates the situation in which the beam is out of focus because the objective lens is too near the compact disk. The focusing-error signal is positive—FE=(AS+CS) −(BS+DS)>0. A positive value indicates to the focusing loop that the lens is too near the disk. The controls in the loop accordingly move the lens away from the disk until the focusing-error signal becomes zero.

How the tracking loop controls tracking will now be explained.

The laser beams L1, L2, and L3 are precisely on track in FIGS. 1a, 1b, and 1c, and the tracking-error signal is zero—TE=ES−FS=0.

FIG. 1d illustrates the situation in which laser beams L1, L2, and L3 are off the track to the right. The tracking-error signal is positive—TE=ES−FS<0. The controls in the tracking loop move the optical pick-up toward the left until the tracking-error signal becomes zero.

FIG. 1e illustrates the opposite situation, in which laser beams L1, L2, and L3 are off the track to the left. The tracking-error signal is positive—TE=ES−FS>0. The controls in the tracking loop move the optical pick-up toward the right until the tracking-error signal becomes zero.

The design of one embodiment of the invention and then its operation will now be described with reference to FIG. 2.

Figure 2:
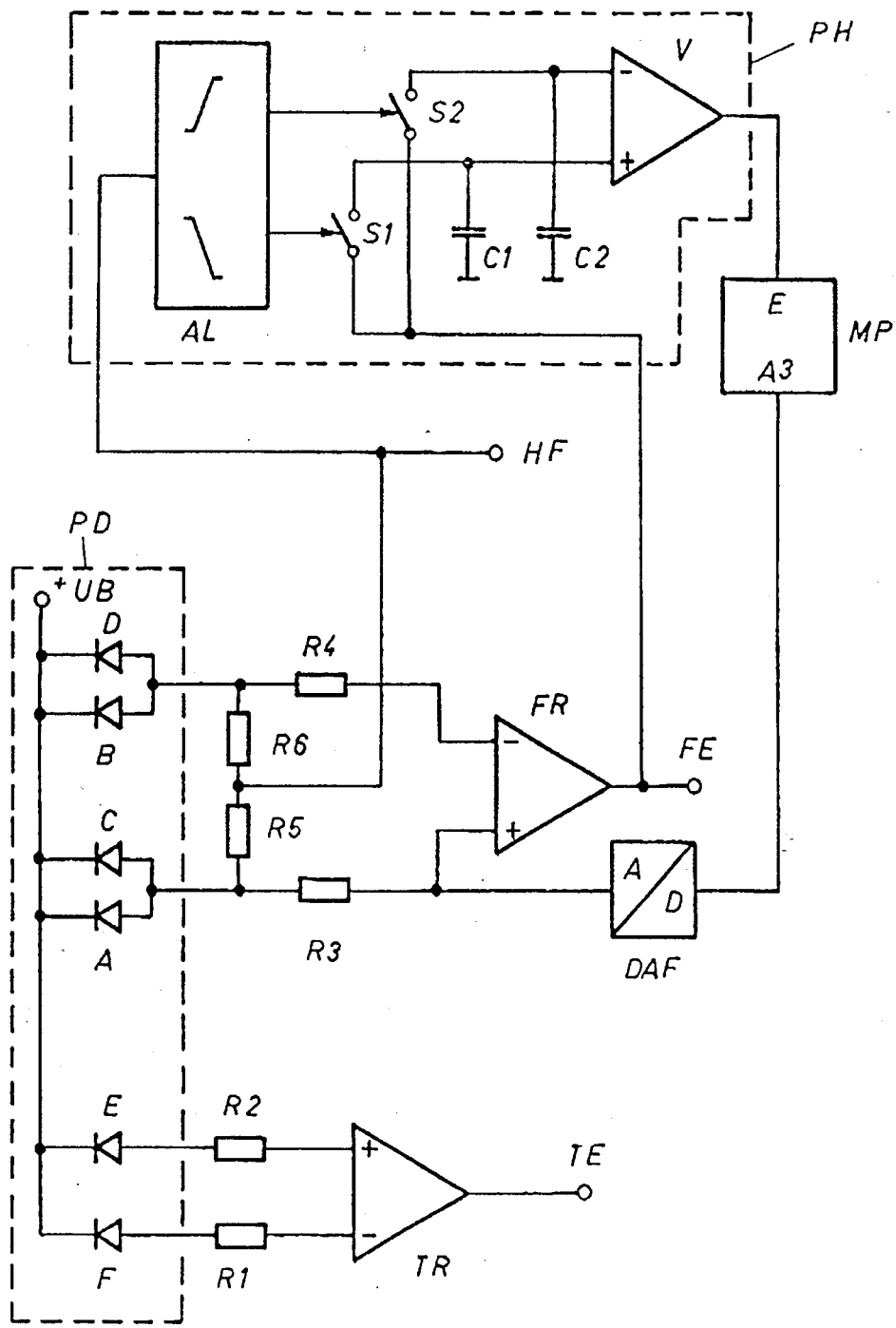
FIG. 2 illustrates one embodiment of a compact-disk player in accordance with the invention.

There is a voltage +UB at the interconnected cathodes of the six photodiodes A, B, C, D, E, and F in the photodetector PD illustrated in FIG. 2. The anode of photodiode F is connected by way of a resistor R1 to the inverting input terminal of a variable-gain amplifier TR in the tracking loop. The anode of photodiode E is connected by way of another resistor R2 to the non-inverting input terminal of variable-gain amplifier TR. The interconnected anodes of photodiode A and C are connected by way of a third resistor R3 to the non-inverting input terminal of a variable-gain amplifier FR in the focusing loop. The also interconnected anodes of diodes B and D are connected by way of a fourth resistor R4 to the inverting input terminal of variable-gain amplifier FR. Between the interconnected anodes of diodes A and C and the interconnected anodes of diodes B and D is a series circuit consisting of resistors R5 and R6, the common junction of which is connected to the input terminal of an analog switch AL. The output terminal of the variable-gain amplifier FR in the focusing loop is connected to one contact of a variable switch S1 and of a variable switch S2. The other contact of variable switch S1 is connected to the non-inverting input terminal of an amplifier V and to one terminal of a capacitor C1, the other terminal of which is at reference potential. The other contact of variable switch S2 is connected to the inverting input terminal of amplifier V and to one terminal of a capacitor C2, the other terminal of which is also at reference potential. The output terminal of analog switch AL that releases a pulse when there is a descending edge at its input terminal is connected to the control input terminal of variable switch S1. The output terminal of analog switch AL that releases a pulse when there is an ascending edge at its input terminal is connected to the control input terminal of variable switch S2. The output terminal of amplifier V is connected to the input terminal E1 of a microprocessor MP, which has an output terminal A3 that is connected to the input terminal of a digital-to-analog converter DAF. The non-inverting input terminal of the variable-gain amplifier FR in the focusing loop is connected to the output terminal of digital-to-analog converter DAF. Focusing-error signal FE can be obtained from the output terminal of the variablegain amplifier FR in the focusing loop, tracking-error signal TE from the output terminal of the variable-gain amplifier TR in the tracking loop, and the data signal HF from the common junction of resistors R5 and R6.

How the embodiment illustrated in FIG. 2 operates will now be described.

Analog switch AL, variable switches S1 and S2, capacitors C1 and C2, and amplifier V, constitute a phase comparator PH that compares the phase of data signal HF with focusing-error signal FE. The signal at the output terminal of amplifier V indicates to microprocessor MP whether data signal HF is in phase with variable-gain amplifier FR. The value released by microprocessor MP at its output terminal A3 is converted by digital-to-analog converter DAF into an analog voltage that is applied in the form of an offset-compensation voltage to the non-inverting input terminal of variable-gain amplifier FR. Microprocessor MP now varies the value at output terminal A3 until amplifier V indicates that data signal HF and focusing-error signal FE are in phase. This value is retained and converted by digital-to-analog converter DAF into an analog voltage that is employed as an offset-compensation voltage to compensate the offset voltage from variable-gain amplifier FR.

If the offset voltage changes, as the result of temperature fluctuations for instance, microprocessor MP will immediately correct the offset-compensation voltage. The offset-compensation voltage is accordingly constantly monitored and corrected in accordance with fluctuations in the offset voltage while the compact-disk player is in operation.

The function of phase comparator PH will now be described.

Data signal HF is at the input terminal of phase comparator PH, which is also the input terminal of analog switch AL. At every descending edge of data signal HF, analog switch AL briefly closes variable switch S1, charging capacitor C1 to the level that focusing-error signal FE assumes at the instant of a descending edge of data signal HF.

At every ascending edge of data signal HF on the other hand, analog switch AL briefly closes variable switch S2, charging capacitor C2 to the level that focusing-error signal FE assumes at the instant of an ascending edge of data signal HF. Since data signal HF consists, like focusing-error signal FE, of the photoelectric voltages AS, BS, CS, and DS of the four photodiodes A, B, C, and D that the data-scanning laser beam L1 is reflected onto by the compact disk, the two signals are, in the ideal situation, when, that is, there is no offset voltage at variable-gain amplifier FR, in phase. Given an identical phase relation, however, focusing-error signal FE will, in the presence of a descending edge on the part of data signal HF, have the same value that it does in the presence of an ascending edge on the part of the data signal because the edges represent the point at which the signal is traversing zero.

If, on the other hand, variable-gain amplifier FR is subject to an offset voltage, the zero transitions of data signal HF will no longer coincide with those of focusing-error signal FE. The focusing-error signal will accordingly have different values instead of identical values in the presence of ascending and descending data-signal edges. Microprocessor MP will accordingly as previously described herein detect from the output signal from amplifier V whether focusingerror signal FE and data signal HF are in phase. If they are, the correct offset-compensation voltage will be present at the non-inverting input terminal of variable-gain amplifier FR. I they are not in phase, however, microprocessor MP will vary the value at its output terminal A3 until the offset-compensation voltage at the output terminal of digital-to-analog converter DAF assumes the correct value.

I claim:

1. An arrangement for reproducing data readable by an optical scanner from tracks on a recorded medium, comprising:

focus control means for focusing at least one beam of light on the medium tracking control means for positioning said beam of light along said tracks; a photodetector for receiving said beam after being reflected by said medium; said photodetector generating an electrical data signal with a phase relation, a focusing error signal with a phase relation for indicating the current state of said focus control means, and a tracking error signal indicating the current state of said tracking control means; control amplifier means in said focus control means and having an offset voltage and an input; a source of offset compensation voltage connected to said input of said control amplifier for compensating said offset voltage of said control amplifier; and means for varying said offset compensation voltage at said input of said control amplifier until the phase relation of said focusing error signal coincides with the phase relation of said data signal for obtaining a correct value for said offset compensation voltage, said offset compensation voltage having a correct value when the two phase relations coincide.

2. An arrangement for reproducing data readable by an optical scanner from tracks on a recorded medium, comprising: focus control means for focusing at least one beam of light on the medium; tracking control means for positioning said beam of light along said tracks; a photodetector for receiving said beam after being reflected by said medium; said photodetector generating an electrical data signal with a phase relation, a focusing error signal with a phase relation for indicating the current state of said focus control means, and a tracking error signal indicating the current state of said tracking control means; control amplifier means in said focus control means and having an offset voltage and an input; a source of offset compensation voltage connected to said input of said control amplifier for compensating said offset voltage of said control amplifier; and means for varying said offset compensation voltage at said input of said control amplifier until the phase relation of said focusing error signal coincides with the phase relation of said data signal for obtaining a correct value for said offset compensation voltage, said offset compensation voltage having a correct value when the two phase relations coincide; phase comparator means having a first input receiving said data signal, said phase comparator means having a second input receiving said focusing error signal, said phase comparator means having an output; a microprocessor having an input connected to said output of said phase comparator means said microprocessor having an output; a digital-to-analog converter with input connected to said output of said microprocessor, said digital-to-analog converter having an output connected to an input of said control amplifier; said output of said microprocessor having a digital value varying until said phase comparator means emits a signal to said input of said microprocessor indicating that said data signal is in shape with said focusing error signal.

3. An arrangement as defined in claim 2 including analog switch having an input connected to said output of said photodetector, said analog switch having an output variable switch having a control input connected to of said analog switch, said output of said analog switch reacting to a descending edge of a signal; said switch having an output reacting to an ascending signal; a second variable switch having a control input connected to said output of said first variable switch said first and second variable switches having a first contact connected to said output of said control amplifier; additional amplifier having a non-inverting input connected to a second contact of said first variable switch; a source of reference potential; capacitor means connected between said source of reference potential and said non-inverting input of said additional amplifier; said second variable switch having a second contact, said additional amplifier having an inverting input connected to said second contact of said second variable switch; additional capacitor means connected between said source of reference potential and said inverting input of said additional amplifier; said additional amplifier having an output connected to said input of said microprocessor.

* * * * *